United States Patent Office 3,206,932
Patented Sept. 21, 1965

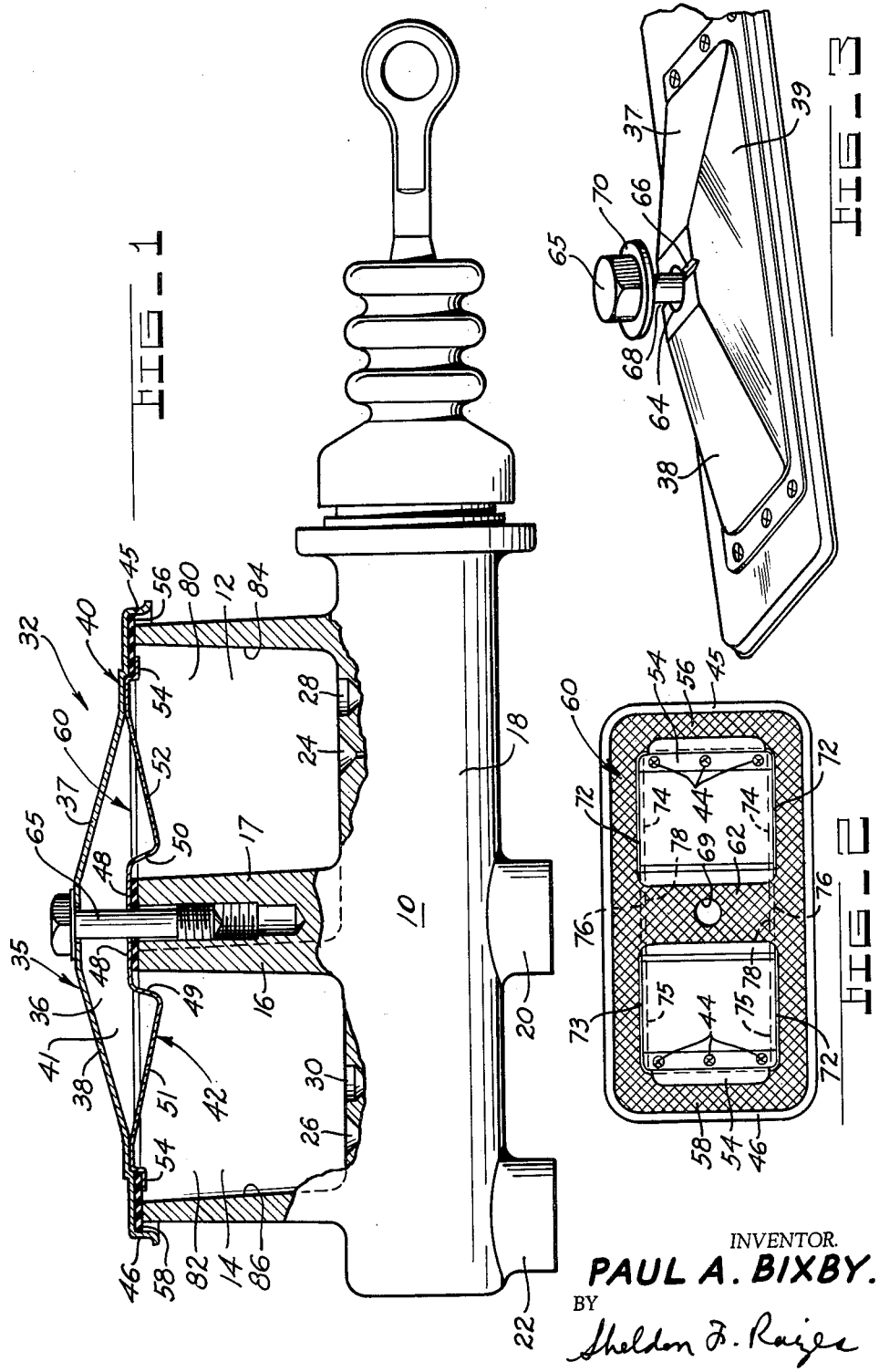

3,206,932
CAP FOR DUAL MASTER CYLINDER RESERVOIR
Paul A. Bixby, Niles, Mich., assignor to The Bendix Corporation, St. Joseph, Mich., a corporation of Delaware
Filed Aug. 27, 1962, Ser. No. 219,679
10 Claims. (Cl. 60—54.6)

This invention relates to a cap and more particularly to a cap for covering a reservoir of a split system master cylinder.

One of the problems of a split system master cylinder has been in providing for brake fluid communication between two fluid chambers of the reservoir when one chamber overflows while preventing brake fluid communication between the chambers at all other times.

Accordingly, it is an object of this invention to provide a split system master cylinder reservoir with a cap which will allow brake fluid communication between two fluid chambers of the reservoir if one overflows, but will prevent brake fluid communication at all other times.

Other features and objects of the invention will become apparent from the following description which refers to the accompanying drawing which illustrates an embodiment of the invention by way of example.

In the drawing:

FIGURE 1 is an elevational view of a split master cylinder partially cut-away to illustrate a cap therefor in section;

FIGURE 2 is a bottom view of the master cylinder cap of FIGURE 1; and

FIGURE 3 is a diametric view of the cap of FIGURE 1.

Referring to the drawing, there is illustrated a master cylinder housing 10 comprising a reservoir having two fluid chambers 12, 14 separated by an inner wall 16. A longitudinal housing 18 of the master cylinder has a longitudinal bore with a pair of plungers slidably mounted therein. Outlet ports 20 and 22 may be each communicated to a pair of wheel cylinders and compensating ports 24 and 26, and replenishing ports 28 and 30 communicate the reservoir fluid chambers 12 and 14 with their respective fluid chambers of the longitudinal bore. The plunger construction within the longitudinal housing 18 may be of the constructions which are disclosed in copending application U.S. Serial No. 49,765, filed August 15, 1960 and now U.S. Patent No. 3,149,468 (common assignee). A cap 32 is provided and comprises a rectangular top member 35 which has surfaces 36, 37, 38 and 39 raised from a peripheral flange 40 to define a cavity 41. A rectangular shaped baffle member 42 is secured by spot welds 44 to the lateral ends of the flange 40 and is bowed away from the top member. The baffle member 42 has a cross section, taken from the center thereof to each lateral end 45 and 46, of a central portion 48 extending in a plane coinciding generally with the plane of the flange 40, then a downwardly extending portion 49, 50 which extends below the flange 40 and then a portion 51, 52 sloping upwardly. A lip 54 is located at each lateral end of the baffle member and integral therewith. The lip 54 and the bottom surface of the flange 40 form a groove for receiving a portion of each lateral end 56, 58 of a sealing gasket 60. The sealing gasket has a rectangular shaped outer periphery and a transverse strip 62 integral therewith.

The top member 35 of the cap has an oversized opening 64 for receiving a bolt 65. Grooves or notches 66 and 68 intersect the opening 64 for a purpose to be described hereinafter. The bolt 65 extends through an opening in the central portion 48 of the baffle member and has an interference fit with an opening 69 in the gasket for the purpose of retaining the bolt with the cap when it is removed from the master cylinder. A flat flange 70 is integral with the bolt 65 and seats flat against the top member and overlaps a portion of each notch or groove 66 and 68 when the cap is secured to the master cylinder.

The cap is secured to the reservoir by screwing the bolt 65 in a threaded opening of a boss 17 integral with the wall 16. When the cap is secured to the reservoir the edges 72 and 73 will be spaced about one-sixteeth ($\frac{1}{16}$) inch from the sidewalls 80 and 82 of the chambers and the walls which are parallel with walls 80 and 82. Hereinafter the reference numerals 80 and 82 will include the walls parallel to those illustrated as 80 and 82. Since the baffle member is bowed away from the top, the edges 76 of the central portion 48 of the baffle member are biased against the portion 78 of the inner flange edges when the cap is secured to the reservoir resulting in compressing the gasket piece 62 against the end of the wall 16 thereby sealing the chambers 12 and 14 from each other except through the cavity 41 and the openings defined by the lateral edges 72 and 73 of the baffle member, the inner peripheral edges 74 and 75 of the flange 40, and the walls 80 and 82. The oversized opening 64 and notches or grooves 66 and 68 provide venting to the atmosphere for the chambers 12 and 16.

During operation of a split system master cylinder there is some leakage between the fluid chambers in the bore of the longitudinal portion 18. The result is that one fluid chamber 12 or 14 acquires more fluid than what it started out with and the other chamber has less fluid than with what it started out. Assuming that chamber 12 starts to become overfilled, the overflow will pass through the opening defined by the lateral edges 72 of the baffle member, the inner lateral edges 74 of the flange 40, and the walls 80 and 82, into the cavity 41 and out through the opening defined by the lateral edges 73 of the baffle member and the inner lateral edges 75 of the flange 40 into the fluid chamber 14.

A "splash" condition may be caused by bouncing of a vehicle on which the master cylinder is mounted or by squirting of brake fluid from the compensating ports 28 or 30 back into their respective fluid chambers 12 and 14. When this condition arises the fluid will be deflected by the sloping portions 51 and 52 away from the wall 16 and against the walls 84 or 86 and then in a direction toward the bottom wall of the chambers 12 and 14 or will be deflected in a direction directly toward the bottom wall of the chambers 12 and 14. If the vehicle is sloped toward the front, any break fluid in fluid chamber 12 impinging on the sloping portion 52 of the baffle member tending to roll down the sloping portion 52 toward the wall 16 will roll until it gets to the intersection of surface 50 at which time the fluid will either drop downward into the reservoir or strike the wall 16 below the sealing connection between the center portion 48 of the baffle member, gasket piece 62 and wall 16. This connection may not always form a perfect seal and preventing brake fluid from gathering around that connection will prevent leakage from one chamber into the other during splash condition. Obviously, if the vehicle is sloped toward the rear, any brake fluid in chamber 14 which rolls down the sloping portion 51 will strike the wall 16 below the seal connection between the center portion 48 of the baffle member and the end of the wall 16.

Although this invention has been illustrated and described in connection with a specific embodiment, numerous other adaptations of the invention will become apparent to those skilled in the art from the description in conjunction with the accompanying claims whereby the same or substantially the same results may be obtained.

Having thus described the features of the invention, what I claim as new and desire to secure by Letters Patent is:

1. A cap comprising: a member having a top part defining a cavity and a bottom part bridging said cavity; said bottom having a portion of its inner surface spaced from and facing the inner surface of said top; means on opposite sides of the center of the cap for communicating said cavity with the exterior of said bottom, and breather port means for communicating said cavity with the exterior of said top.

2. A cap comprising: a member having a top part defining a cavity therein and a bottom part bridging said cavity; at least a portion of the interior surface of the bottom facing and spaced from the portion of said interior surface of the top opposite said bottom; said bottom comprising portions in cross section, taken from near a part of said bottom which is located intermediate the lateral ends thereof toward each lateral end, extending downwardly away from said top interior surface portion and then sloped toward said top interior surface portion; the lateral edges of said portions of said bottom and the interior surface of said top opposite said edges defining openings leading to the cavity between said bottom and said top, and breather port means communicating said cavity to the exterior of said top.

3. A cap comprising: a top member having a portion defining a cavity and a flange surrounding said cavity; a baffle member at the bottom of said top member bridging said cavity and spaced from the interior surface of the top member opposite said baffle member; the lateral ends of said baffle member being attached to the bottom surface of the lateral ends of said flange and the lateral edges of said baffle member overlapping said flange but spaced from the outer peripheral lateral edges of said flange; said baffle member comprising portions in cross section, taken from near a part of said baffle member which is located intermediate the lateral ends thereof toward each lateral end, extending downwardly away from said interior surface of said top member and beyond the bottom surface of said flange and then sloped toward said interior surface; the lateral edges of said baffle member portions and the flange surface opposite them defining openings leading to the cavity between said baffle member and said top member; sealing means engaging the bottom surface of said flange throughout its entire periphery and engaging the bottom surface of said part of said baffle member from one lateral edge of said part of said baffle member to the other lateral edge of said part of said baffle member; and breather port means communicating said cavity to the exterior of said top member.

4. A cap comprising: a rectangular shaped top member having a portion defining a cavity and a flange surrounding said cavity; a rectangular shaped baffle member at the bottom of said top member bridging said cavity and spaced from the interior surface of the top member opposite said baffle member; the lateral ends of said baffle member being attached to the bottom surface of the lateral ends of said flange and spaced from the peripheral edges thereof; the lateral edges of said baffle member overlapping said flange but spaced from the outer peripheral lateral edges of said flange; said baffle member comprising portions in cross section, taken from a part of said baffle member intermediate the lateral ends thereof toward each lateral end, extending in a plane substantially coincident with the plane of the flange; then downwardly away from said interior surface of said top member and beyond the bottom surface of said flange and then sloped toward said interior surface; the lateral edges of said baffle member portions and the flange surface opposite them defining openings leading to the cavity between said baffle member and said top member; a rectangular shaped sealing member having two openings therein, said openings being so constructed and arranged that the openings will encompass the downwardly extending portions and the sloped portions of said baffle member and that said sealing member will engage the bottom surface of said flange and the bottom surface of the baffle member portion which is in a plane substantially coincident with the plane of said flange; and breather port means for communicating said cavity to the exterior of said top member.

5. A cap as recited in claim 4 wherein said baffle member has a depending flange on the lateral ends thereof; each said depending flange having a portion which is spaced from said first mentioned flange forming a groove therebetween, the lateral ends of said sealing member having a portion thereof inserted in said grooves whereby said sealing member is retained on said cap by said depending flange.

6. The combination of a split master cylinder and cap therefor comprising: said master cylinder having a reservoir comprising an outer peripheral wall and an inner wall dividing said reservoir into two fluid chambers; a cap comprising a member having a top part defining a cavity and a bottom part bridging said cavity; said bottom having a portion of its inner surface spaced from and facing the inner surface of said top; said cap including means on opposite sides of said inner wall for communicating said cavity with said chambers; and breather port means for communicating said cavity with the exterior of said cap.

7. The combination of a split master cylinder and cap therefor comprising: said master cylinder having a reservoir comprising an outer peripheral wall and an inner wall dividing said reservoir into two fluid chambers; said cap comprising a member having a top part defining a cavity therein and a bottom part bridging said cavity; at least a portion of the interior surface of the bottom facing and spaced from the portion of said interior surface of the top opposite said bottom; said bottom comprising portions in cross section taken from near said inner wall toward each lateral end, extending downwardly away from said top interior surface portion and then sloped toward said interior surface portion; each of said downwardly extending portions and sloped portions being disposed in a respective fluid chamber; the lateral edges of said portions of said bottom, the interior surface of said top opposite said edges and the chamber walls opposite said edges defining openings leading from said fluid chambers to said cavity, breather port means communicating said cavity to the exterior of said top, sealing means between said cap and said walls, and means securing said cap to said master cylinder reservoir.

8. The combination of a split master cylinder and cap therefor comprising: said master cylinder having a reservoir comprising an outer peripheral wall and an inner wall dividing said reservoir into two fluid chambers; said cap comprising a top member having a portion defining a cavity and a flange surrounding said cavity; a baffle member at the bottom of said top member bridging said cavity and spaced from the interior surface of the top member opposite said baffle member; the lateral ends of said baffle member being attached to the bottom surface of the lateral ends of said flange; the lateral edges of said baffle member overlapping said flange but spaced from the outer peripheral lateral edges of said flange; said baffle member comprising portions in cross section, taken from near said inner wall toward each lateral end, extending downwardly away from said interior surface of said top member and beyond the bottom surface of said flange and then sloped toward said interior surface, each of said downwardly extending portions and sloped portions being disposed in a respective fluid chamber, the lateral edges of said baffle member portions, the flange surface opposite them, and the chamber walls opposite said last mentioned edges defining openings leading from said fluid chambers to the cavity between said baffle member and said top member; sealing means located between the end surfaces of said walls and said cap and engaging said end surfaces, the bottom surface of said flange throughout its entire periphery, and the bottom surface of said baffle member opposite said inner wall; and breather port means communicating said cavity to the exterior of said top member, and means securing said cap to said master cylinder reservoir.

9. The combination of a split master cylinder and cap therefor comprising: said master cylinder having a reservoir comprising an outer peripheral wall and an inner wall dividing said reservoir into two fluid chambers; said cap comprising a rectangular shaped top member having a portion defining a cavity and a flange surrounding said cavity; a rectangular shaped baffle member at the bottom of said top member bridging said cavity and spaced from the interior surface of said top member opposite said baffle member; the lateral ends of said baffle member being attached to the bottom surface of the lateral ends of said flange and spaced from the peripheral edges thereof; the lateral edges of said baffle member overlapping said flange but spaced from the outer peripheral lateral edges of said flange; said baffle member comprising portions in cross section, taken from said inner wall toward each lateral end, extending in a plane substantially coincident with the plane of said flange, then downwardly away from said interior surface of said top member and beyond the bottom surface of said flange and thence sloped toward said interior surface; each of said downwardly extending portions and sloped portions being disposed in a respective fluid chamber; the lateral edges of said baffle member portions, the flange surface opposite them, and the chamber walls opposite said last mentioned edges defining openings leading from said fluid chambers to said cavity; breather port means communicating said cavity to the exterior of said top member; means securing said cap to said master cylinder reservoir; and a sealing member of substantially the same shape as that outlined by the walls of said reservoir and seated between said cap and the ends of said wall; said sealing member being compressed between the outer peripheral wall end surface of said reservoir and the bottom surface of said top member flange and between the inner wall end surface and the bottom surface of the baffle member portion which is in a plane substantially coincident with the plane of said flange.

10. The combination as recited in claim 8 wherein said top member, said baffle member, said sealing member and the end of said inner wall have aligned openings therein; said securing means comprising a bolt extending through said aligned openings and threadedly connected to said inner wall; said aligned opening in said top member being larger than the diameter of said bolt; at least one groove extending from and intersecting said top member aligned opening; said top member aligned opening and said groove comprising said breather port means for communicating said cavity to the exterior of said cap.

References Cited by the Examiner
UNITED STATES PATENTS

| | | | |
|---|---|---|---|
| 2,174,615 | 10/39 | Bowen et al. | 60—54.6 |
| 2,194,816 | 3/40 | Van Vestrant et al. | 60—54.6 |
| 2,504,072 | 4/50 | Friend et al. | 220—44 |
| 3,023,924 | 3/62 | Boyer | 220—39 |

JULIUS E. WEST, *Primary Examiner.*

ROBERT R. BUNEVICH, *Examiner.*